United States Patent [19]
Sugimoto

[11] Patent Number: 5,908,239
[45] Date of Patent: Jun. 1, 1999

[54] AIMING MECHANISM FOR VEHICLE LAMPS

[75] Inventor: Atsushi Sugimoto, Shimizu, Japan

[73] Assignee: Koito Manufacturing Co., Ltd., Tokyo, Japan

[21] Appl. No.: 08/886,175

[22] Filed: Jul. 1, 1997

[30] Foreign Application Priority Data

Jul. 2, 1996 [JP] Japan .................................. 8-189929

[51] Int. Cl.$^6$ ...................................................... B60Q 1/06
[52] U.S. Cl. ......................... 362/528; 362/515; 362/421; 362/428
[58] Field of Search ..................................... 362/523, 528, 362/289, 428, 514, 515, 421; 403/130, 131, 122, 119

[56] References Cited

U.S. PATENT DOCUMENTS

| | | |
|---|---|---|
| 4,503,486 | 3/1985 | Makita . |
| 4,845,598 | 7/1989 | Watanabe et al. . |
| 4,881,152 | 11/1989 | Watanabe et al. . |
| 4,916,587 | 4/1990 | Hirose et al. . |
| 5,003,436 | 3/1991 | Yamada et al. . |
| 5,209,558 | 5/1993 | Suzuki et al. . |
| 5,360,282 | 11/1994 | Nagengast et al. . |
| 5,541,815 | 7/1996 | Nakamura . |
| 5,546,283 | 8/1996 | Ohtsuka et al. . |
| 5,678,915 | 10/1997 | Shirai et al. ............................ 362/528 |

FOREIGN PATENT DOCUMENTS

| | | |
|---|---|---|
| 0565422 | 10/1993 | European Pat. Off. . |
| 2285307 | 7/1995 | United Kingdom . |

Primary Examiner—Thomas M. Sember
Attorney, Agent, or Firm—Koda & Androlia

[57] ABSTRACT

A vehicle headlamp has a reflector coupled to a lamp housing via a pivotal connection and two aiming mechanisms for tilting the reflector relative to the lamp housing about horizontal and vertical axes intersecting at the pivotal connection. One such aiming mechanism comprises an aiming screw rotatably mounted to the lamp housing, a socket member affixed to the back of the reflector, and a ball with a tapped hole extending therethrough to fit over the aiming screw. The socket member has a hollow extending therethrough for receiving the aiming screw with clearance. Part of the hollow in the socket member is formed into a socket for rotatably receiving the ball on the aiming screw. A lockpin on the ball is engaged in a slot in the socket member thereby locking the ball against rotation relative to the socket member about the axis of the hole therein. The bidirectional rotation of the aiming screw is therefore translated into the linear reciprocation of the ball together with the socket member, which member is additionally free to undergo angular displacement relative to the ball for smoother tilting of the reflector.

11 Claims, 7 Drawing Sheets

AIMING MECHANISM FOR VEHICLE LAMPS

BACKGROUND OF THE INVENTION

This invention relates generally to electric lamps, and particularly to those for use on motor vehicles such as, typically, headlamps. Still more particularly, the invention pertains to improvements in or relating to aiming mechanisms for aiming and retaining the beams of headlamps or the like in proper angular positions with respect to the vehicle.

Aimable headlamps may be divided into two broad categories according to the member to be tilted, both vertically and horizontally, for aiming the beam. In one such design the complete headlamp unit, comprising an electric lighting bulb or bulbs, a reflector or reflectors and a lens, is tilted relative to the vehicle or to the lamp housing fixed to the vehicle. The other design is such that only the reflector is tilted relative to the lamp body or the like which is fixed to the vehicle.

In either case, a typical aiming mechanism comprises a pivotal connection such as a ball-and-socket joint between a tiltable member and a fixed member, and two aiming screws extending between the two members. The relative placement of the pivotal connection and the aiming screws is such that the first of the two aiming screws is displaced horizontally, and the second vertically, from the pivotal connection. The tightening or loosening of the first aiming screw results, therefore, in the tilting of the tiltable member about a vertical axis passing through the pivotal connection and the second aiming screw. Similarly, the manipulation of the second aiming screw results in the tilting of the tiltable member about a horizontal axis passing through the pivotal connection and the first aiming screw.

A problem has been encountered with aiming mechanisms of the foregoing general construction. Conventionally, each aiming screw was rotatably supported by the fixed member and screw-threadedly engaged with a nut affixed to the tiltable member. When each aiming screw was turned in either direction, the nut engaged therewith had to travel arcuately with the tiltable member about either of the two axes but was nevertheless constrained to rectilinear displacement on the aiming screw. The resulting conflict between the circular and the linear motions impeded the smooth tilting of the tiltable member.

This drawback of the prior art became even more pronounced when a leveling actuator was employed in substitution for one of the aiming screws. As the name implies, the leveling actuator is intended for automatic readjustment of the beam angle in a vertical plane in response not only to changes in the load on the vehicle but also to the pitching of the vehicle during travel. The leveling actuator is required to act very quickly in order to readjust the beam angle in compensation for vehicle pitching. The conventional aiming mechanisms with their conflicting motions have presented a serious bar to the advent of automatically leveling headlamps of truly satisfactory performance.

SUMMARY OF THE INVENTION

The present invention seeks, in an aimable vehicle lamp of the kind defined, to realize smoother tilting motions of the tiltable member relative to the fixed member in aiming the lamp.

Stated broadly, the invention concerns an aimable vehicle lamp wherein a tiltable member is tilted relative to a fixed member in two orthogonal directions for aiming the lamp. The invention is more specifically directed in such a vehicle lamp, to an aiming mechanism for tilting the tiltable member related to the fixed member in one of the two orthogonal directions. The aiming mechanism comprises an aiming screw to be rotatably supported by the fixed member, a socket member to be affixed to the tiltable member, the socket member having a hollow extending therethrough for receiving the aiming screw with clearance, part of the hollow being formed into a socket, and a ball having a hole extending therethrough for receiving and screw-threadedly engaging the aiming screw, the ball being received in the socket in the socket member and thereby constrained to rotary motion only and locked against rotation relative to the socket member about the axis of the hole in the ball.

It will be understood that the nut that has conventionally been affixed to the tiltable member is replaced according to the invention by the ball rotatably received in the socket member secured to the tiltable member. Thus, when the tiltable member is tilted relative to the fixed member, either by this aiming mechanism or by another that is incorporated in the lamp, the socket member on the tiltable member is free to undergo angular displacement on the ball thereby affording smoother tilting of the tiltable member than heretofore.

The present invention has been completed with due regard to the ease with which the headlamp is assembled. For example, the socket member, which is molded from a resilient material into a substantially tubular shape, is formed to include at least a pair of detents in diametrically opposite positions on one end thereof. Projecting into the hollow in the socket member for rotatably retaining the ball in the socket, the detents are angled toward each other as they extend from said one end of the socket member toward the other. The ball may therefore be forced through the space between the pair of detents into the socket in the socket member, causing the detents to resiliently spread apart in so doing. Once the ball is positioned in the socket, the detents will positively engage the ball to lock the same against detachment from within the socket member.

According to a further feature of the invention the ball is formed to include a pair of flaring guide wings adjacent one end of the hole extending therethrough. The guide wings are intended to smoothly guide the aiming screw into threaded engagement in the hole in the ball.

In a preferred embodiment the tiltable member is tilted in one of the orthogonal directions by the aiming mechanism of the foregoing construction, and in the other direction by a leveling actuator. Mounted to the fixed member, the leveling actuator has a connecting rod extending therefrom and terminating in a ball which is rotatably received in a socket member on the tiltable member. Preferably, this socket member associated with the leveling actuator has formed therein an undercut groove extending vertically for rotatably engaging the ball on the connecting rod. When the tiltable member is tilted about a horizontal axis, the vertically elongated socket functions to take up the relative vertical displacement between the connecting rod and the tiltable member and so enables the smooth tilting of the tiltable member.

The above and other features and advantages of this invention and the manner of realizing them will become more apparent, and the invention itself will best be understood, from a study of the following detailed description and appended claims, with reference had to the attached drawings showing some preferred embodiments of the invention.

DESCRIPTION OF THE PREFERRED EMBODIMENTS

General

Figure 1:
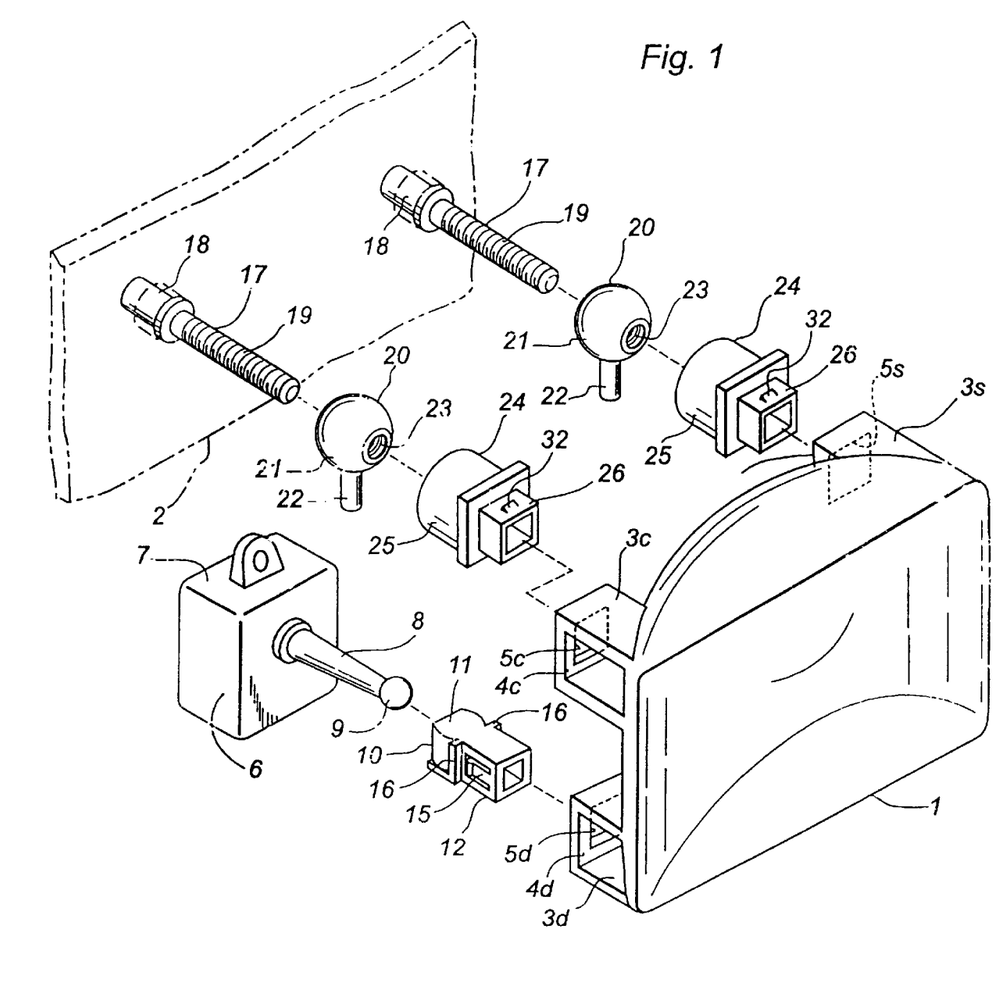
FIG. 1 is an exploded perspective view of an aimable vehicle headlamp embodying the principles of the present invention.

The present invention will now be described in detail as embodied in a vehicle headlamp of the type in which only the reflector, rather than the headlamp unit, is tilted both horizontally and vertically relative to the lamp housing, which is fixed to the vehicle, for aiming the headlamp. With reference to FIG. 1, which illustrates the representative aimable headlamp insofar as is necessary for the full understanding of the invention, a reflector 1, the tiltable member, is shown coupled to a lamp housing 2, the fixed member, via leveling actuator means including a leveling actuator 6, and two aiming screw means of identical make, each including an aiming screw 17. The lamp housing 2 is shown fragmentarily and in phantom outline because of illustrative convenience and of its conventional and well known nature.

The two aiming screw means are shown horizontally spaced from each other, and the leveling actuator means shown spaced downwardly from one of the aiming screw means. However, the aiming screw means just above the leveling actuator means could be replaced by a simple universal connection between the tiltable and fixed members, as in an alternate embodiment of this invention to be disclosed subsequently. The provision of the two aiming screw means, in addition to the leveling actuator means, should not therefore be taken as an essential feature of this invention.

Molded from an engineering plastic, the reflector 1 has a concave reflective surface which is conventionally rendered reflective to reflect the light from a light source such as a discharge bulb, not shown, forwardly of the vehicle. Three hollow bosses 3c, 3s and 3d are formed on the back of the reflector 1 for connection to the leveling actuator means and the aiming screw means.

The following is a more detailed discussion of the leveling actuator means and the two aiming screw means. How the headlamp is aimed will be explained after the discussion of the noted means.

Leveling Actuator Means

With continued reference to FIG. 1 the leveling actuator 6 has an actuator body 7 which is mounted fast to the lamp housing 2, and a connecting rod 8 projecting forwardly from the actuator body. The connecting rod 8 terminates in a ball 9 for pivotal engagement in a socket member 10 which in turn is to be immovably engaged in the boss 3d on the back of the reflector 1.

Figure 5:
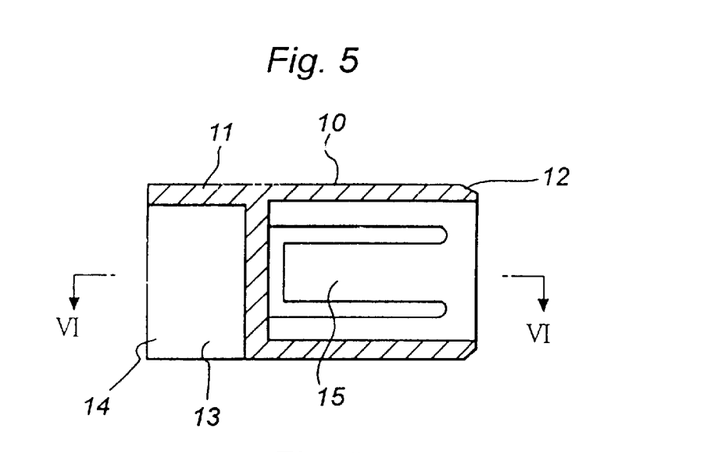
FIG. 5 is an enlarged vertical section through another socket member in the aimable headlamp of FIG. 1.
Figure 6:
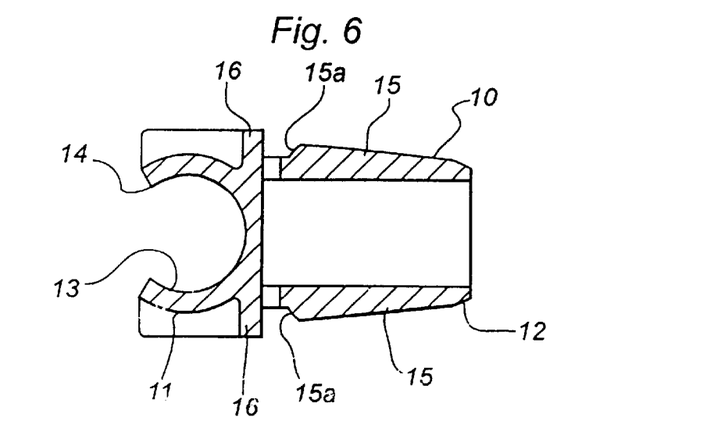
FIG. 6 is a section taken along the line VI—VI in FIG. 5.

As illustrated on an enlarged scale in FIGS. 5 and 6, the socket member 10 is a one-piece molding of a synthetic resin such as, for example, polyacetal, the molding including a socket portion 11 and a selflocking, snap-on connector portion 12. For receiving the ball 9, the socket portion 11 defines an elongate socket 13 which may be described as an undercut groove extending along the vertical axis about which is reflector 1 is to be pivoted horizontally by one of the aiming screw means. Cross sectionally shaped and sized to slidably receive the ball 9, the socket 13 has an entrance slot 14 narrower than the ball diameter. The top end of the socket 13 is closed, and the bottom end thereof left open for admission of the ball 9.

The self-locking, snap-on connector portion 12 of the socket member 10 is in the shape of a tube of rectangular cross section, sized to fit in the hollow boss 3d on the reflector 1 through an opening 5d in its rear wall 4d. A pair of opposite side walls of the connector portion 12 have U-shaped slits formed therein to provide a pair of locking pawls 15 which grow thicker as they extend toward their free ends directed toward the leveling actuator 6, terminating in ledges 15a. A pair of flanges 16 are formed just rearwardly of the ledges 15a of the locking pawls 15.

Such being the construction of the socket member 10, its connector portion 12 may be inserted into the hollow boss 3d on the back of the reflector 1 through the opening 5d in its rear wall 4d. The pair of locking pawls 15 will be resiliently deflected toward each other by the pair of opposed edges of the hollow boss wall 4d bounding the opening 5d, as the connector portion 12 is forced into that opening. Upon full insertion of the connector portion 12, that is, upon abutment of the pair of flanges 16 against the rear wall 4d of the boss 3d, the locking pawls 15 will spring back, having gone clear of the opening 5d, and positively engage the rear wall of the boss between themselves and the flanges 16. The socket member 10 has now been coupled to the reflector 1 against the risk of accidental detachment therefrom.

The ball 9 of the leveling actuator 6 may then be inserted in the socket 13 from its bottom end. A slight shifting of the ball 9 toward the closed top end of the socket 13 will suffice to eliminate the likelihood of accidental ball disengagement from the undercut groove. It is thus seen that the leveling actuator 6 is coupled to the reflector 1 in a ball-and-socket fashion.

Aiming Screw Means

The two aiming screw means seen in FIG. 1 are alike in construction. Like parts of the two means are therefore identified by like reference characters. Only one such means will be described in detail, it being understood that the same description applies to the other. Broadly, each aiming screw means comprises an aiming screw 17, a ball member 20 having a ball 21 with a tapped hole 23 to fit over the aiming screw, and a socket member 24 for rotatably receiving the ball 21.

Each aiming screw 17 is comprised of a head portion rotatably extending through the lamp housing 2 but restrained from axial displacement relative to the same, and a screw-threaded shank 19 projecting forwardly from the lamp housing. The screw 17 may be turned in either direction from behind, that is, outside, the lamp housing 2.

Made from nylon 6 or like plastics, the ball member 20 is a one-piece molding of the ball 21 and a lockpin 22. The tapped hole 23 extends centrally through the ball 21 for engagement with the aiming screw 17. The lockpin 22 extends radially outwardly of the ball 21 and in right angular relationship to the axis of the tapped hole 23. The lockpin 22 functions to prevent the rotation of the ball 21 about the axis of the tapped hole 23 relative to the socket member 24, as will become more understandable from the following detailed description of this socket member.

Figure 2:
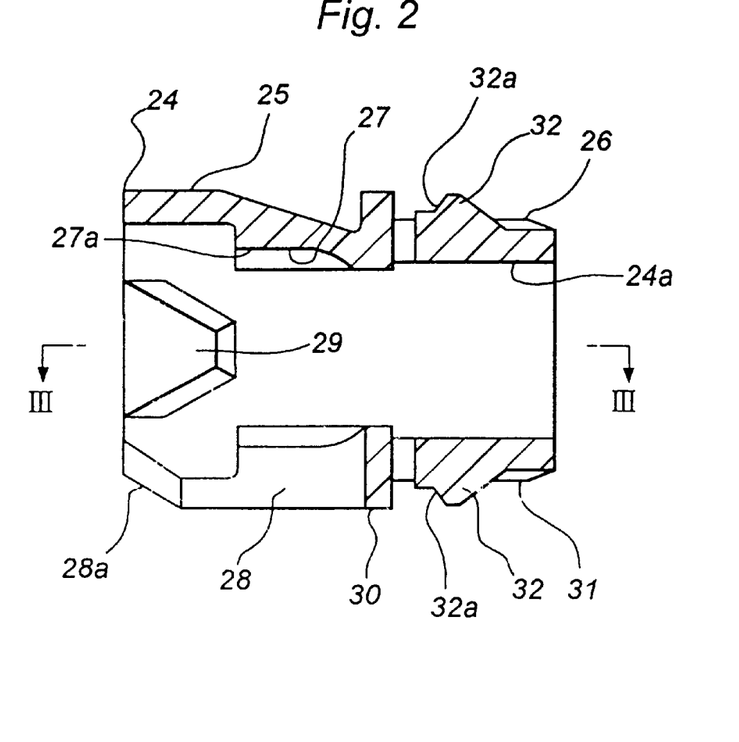
FIG. 2 is an enlarged axial section through each of two identical socket members used in the aimable headlamp of FIG. 1.
Figure 3:
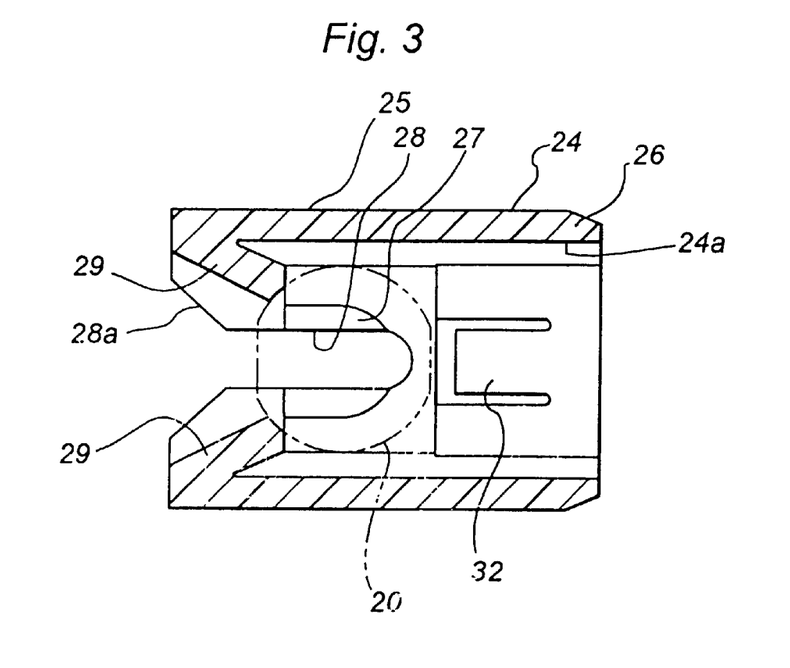
FIG. 3 is a section taken along the line III—III in FIG. 2.

As illustrated in detail in FIGS. 24, the socket member 24, which may be of polyacetal or like engineering plastic material, integrally comprises a socket portion 25 defining a socket 27 of substantially spherical shape, and a self-locking, snap-on connector portion 26 for connecting the socket member to the hollow boss 3c or 3s on the back of the reflector 1. The socket member 24 as a whole is substantially tubular in shape, with a hollow 24a extending therethrough which is large enough in diameter to receive the shank 19 of the aiming screw 17 with substantial clearance, as pictured in FIG. 4.

A midportion of the hollow 24a is formed into the socket 27 for rotatably receiving the ball 21 of the ball member 20. The entrance 27a, FIG. 2, of the socket 27 is formed into a cylinder of the same diameter as the socket for the admission of the ball 21 into the socket. The socket portion 25 has a slot 28 extending forwardly from the rear end of the socket member and terminating approximately at the boundary between socket portion 25 and connector portion 26. The lockpin 22 of the ball member 20 is to be engaged in this slot 28 in order to lock the ball 21 against rotation about the axis of the tapped hole 23 as the aiming screw 17 is turned for aiming the lamp. The rear or entrance end portion of the slot 28 is flared, as best seen at 28a in FIG. 3, for guiding the lockpin 22 into the slot.

FIGS. 2 and 3 indicates air of detents 29 formed in diametrically opposite positions on the rear end of the socket member 24. These detents project into the socket portion 25 and are angled toward each other as they extend from the rear end of the socket member 24 toward the socket 27. Preferably, the opposed faces of the detents 29 should be concaved.

The ball 21 is to be forced into the socket member 24 from its rear end, causing the pair of detents 29 to deflect away from each other by virtue of their resiliency. Once the ball 21 is seated in the socket 27, the detents 29 will spring back into abutment against the ball, thereby firmly retaining the ball in the socket. The detents 29 with their concave surfaces will serve the additional purpose of guiding the ball 21 into the socket. As the ball 21 is so guided into the socket, the lockpin 22 on the ball will also be positively guided into the slot 28 by its flaring end 28a.

Figure 4:
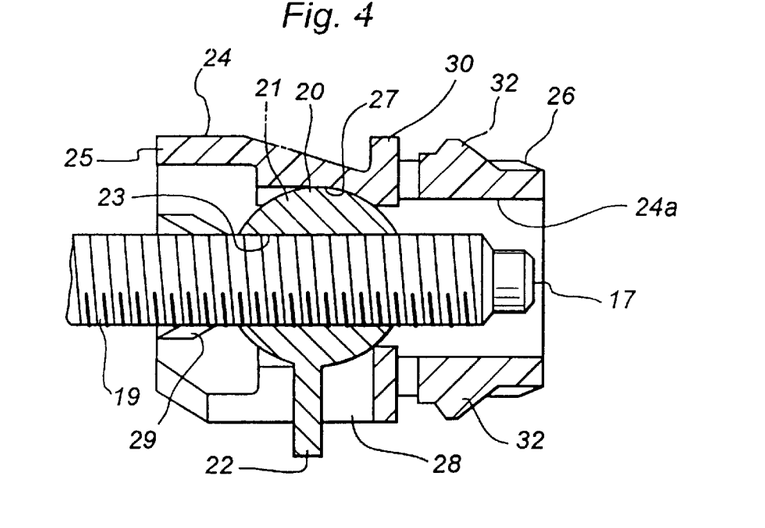
FIG. 4 is a view similar to FIG. 2 except that the socket member is shown together with the ball member rotatably received therein and the aiming screw engaged with the ball.

It is understood that the aiming screw 17 is engaged with the ball 21 before this ball is pushed into the socket member 24. Thus, when the ball 21 is seated in the socket 27 as depicted in FIG. 4, the shank 19 of the aiming screw 17 will be received with considerable clearance in the hollow 24a in the socket member 24, permitting relative angular displacement between ball member 20 and socket member 24.

The self-locking, snap-on connector portion 26 of the socket member 24 includes a tube 31 of rectangular cross section, sized to fit in the hollow boss 3c or 3s on the reflector 1 through an opening 5c or 5s in its rear wall 4c or 4s. The top and bottom walls of the tube 31 have U-shaped slits cut therein to provide a pair of locking pawls 32 which grow thicker as they extend toward their free rear ends from their fixed front ends, terminating in ledges 32a. A flange 30 is formed around the socket member 24, in a position rearwardly just of the ledges 32a of the locking pawls 32.

How the connector portion 26 of the socket member 24 is coupled to the hollow boss 3c or 3s on the reflector 1 is self-evident from the foregoing description of the way the connector portion 12 of the socket member 10 is coupled to the hollow boss 3d. Upon full insertion of the connector portion 26, the pair of locking pawls 32 will positively engage the rear wall 4c or 4s of the boss 3c or 3s between themselves and the flange 30 on the socket member 24.

In the practice of this invention the opening 5s in the right hand boss 3s, as seen in FIG. 1, on the reflector 1 should preferably be made greater in horizontal dimension than the connector portion 26 of the socket member 24, permitting some lateral displacement of the socket member relative to the reflector 1. Such lateral displacement will be effective to take up the misalignment that may arise between reflector boss 3s and the associated aiming screw 17 in horizontally aiming the lamp.

Method of Aiming

The aiming screw 17 seen to the right in FIG. 1 is turned in either direction, the ball 21 will relatively travel forwardly or rearwardly of the screw together with the socket member 24, the rotation of the ball with the aiming screw being prevented by the lockpin 22 engaged in the slot 28 in the socket member. Thus the reflector 1 will tilt about an axis passing through the geometric center of the ball 9 of the leveling actuator 6 and that of the ball 21 of the left hand aiming screw means.

The leveling actuator is to be energized, either automatically or by remote control, for tilting the reflector 1 about another axis, at right angles with the first described axis, passing through the geometric centers of the balls 21 of both aiming screw means. It is also possible in this particular embodiment to turn the two aiming screws 17 in the same direction and at the same time. The reflector 1 will then tilt about an axis passing through the center of the leveling actuator ball 9.

The reflector 1 will move very smoothly when tilted in either direction as above, thanks to the provision of the ball-and-socket joints in all of the three connections between the fixed and the tiltable members. It should also be appreciated that the ball 9 of the leveling actuator 6 is slidably received in the vertically elongated undercut groove 13 in the socket member 10. This modified ball-and-socket joint is preferred because it allows relative vertical displacement of the ball 9 and the socket member 10 when the lamp is being aimed vertically, assuring even smoother tilting of the reflector 1 in that direction.

Alternate Embodiment

Figure 7:
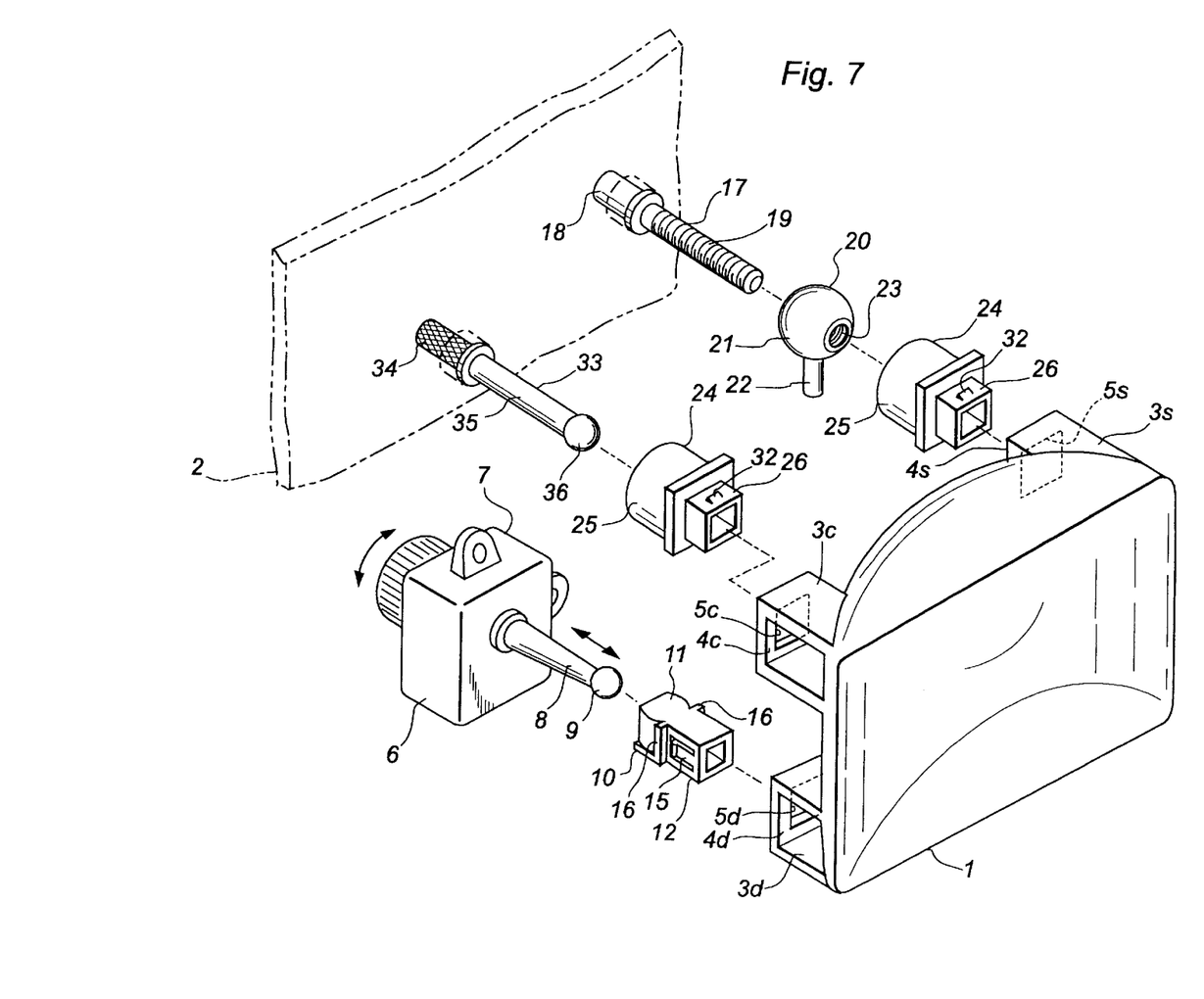
FIG. 7 is an exploded perspective view of another aimable vehicle headlamp embodying the principles of the present invention.

The aimable vehicle headlamp shown in FIG. 7 differs from the FIG. 1 device only the pivotal connection employed at the upper, left hand corner of the reflector 1 in place of the aiming screw of the preceding embodiment. The pivotal connection is a ball-and-socket joint comprises a ball member 33 coupled to the lamp housing 2, and the socket member 24 coupled to the reflector 1. The ball member 33 has a ball 36 formed on one end of a connecting rod 35 which has a knurled part 34 embedded in the lamp housing 2. The ball 36 is rotatably received in the socket portion 25 of the socket member 24, which also has the self-locking, snap-on connector portion 26 received and locked in the hollow boss 3c on the back of the reflector 1. The socket member 24 used in this alternate embodiment can be of the same construction as that shown in FIGS. 2–4, except perhaps for the absence of the slot 28 for receiving the lockpin 22 of the ball member 20.

The reflector 1 is tiltable in two orthogonal directions by the leveling actuator 7 and by the aiming screw 17. The aiming screw means were used in the FIG. 1 embodiment instead of the pivotal connection of this alternate embodiment because the aiming screw means, including the ball-and-socket joint according to the invention, additionally serve as universal joint between the fixed and the tiltable members.

Modified Ball Member and Socket Member

Figure 8:
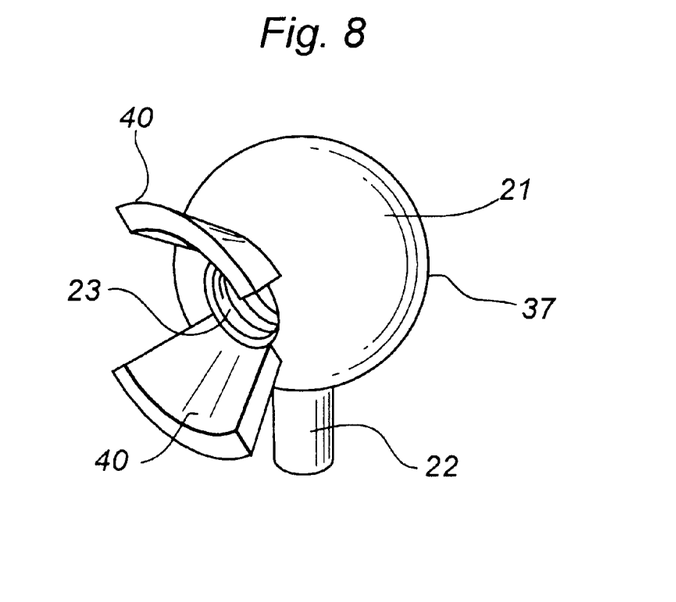
FIG. 8 is a perspective view of a modified ball member for use in the headlamp of FIGS. 1 or 7.
Figure 9:
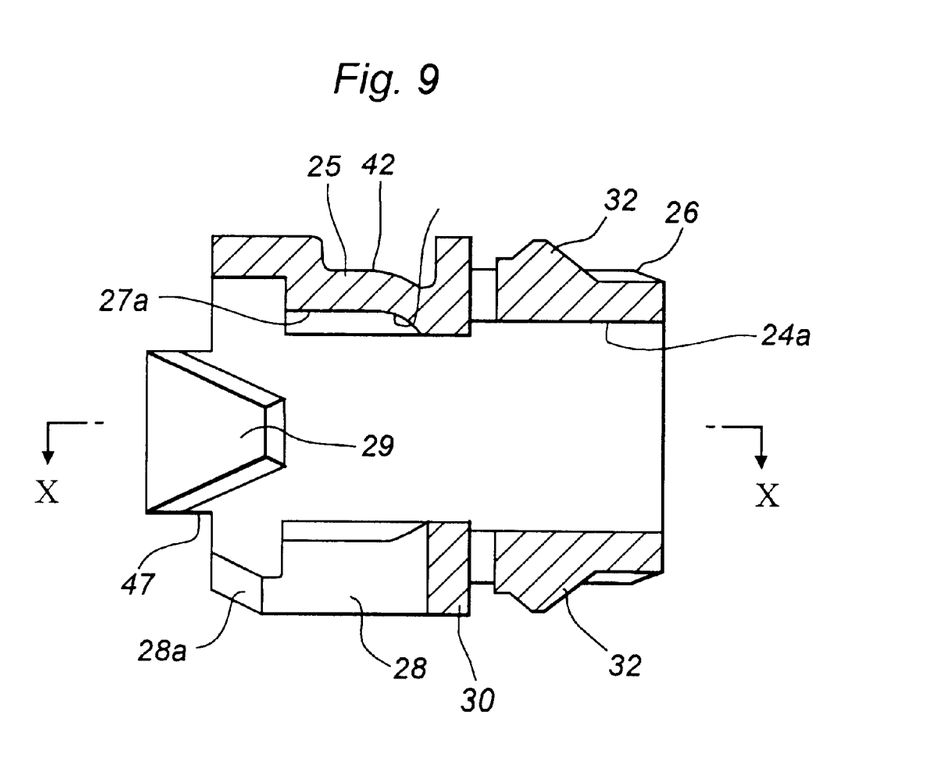
FIG. 9 is an axial section through a socket member suitable for use with the ball member of FIG. 8.
Figure 10:
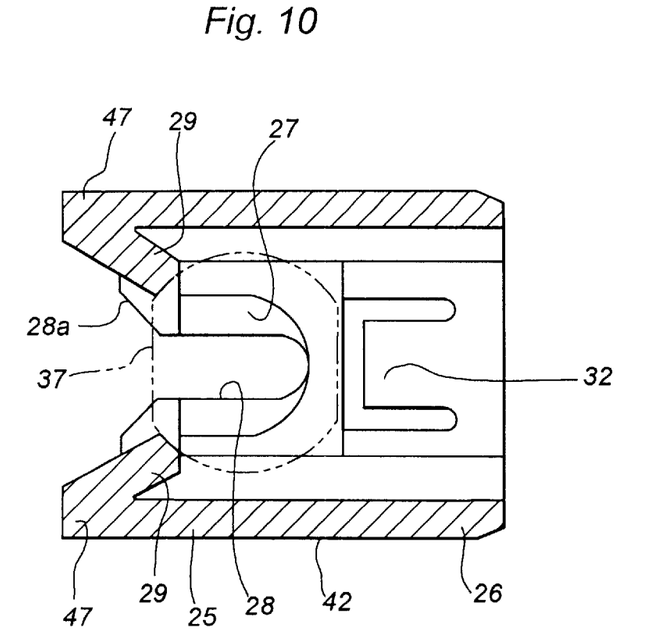
FIG. 10 is a section taken along the line X—X in FIG. 9.
Figure 11:
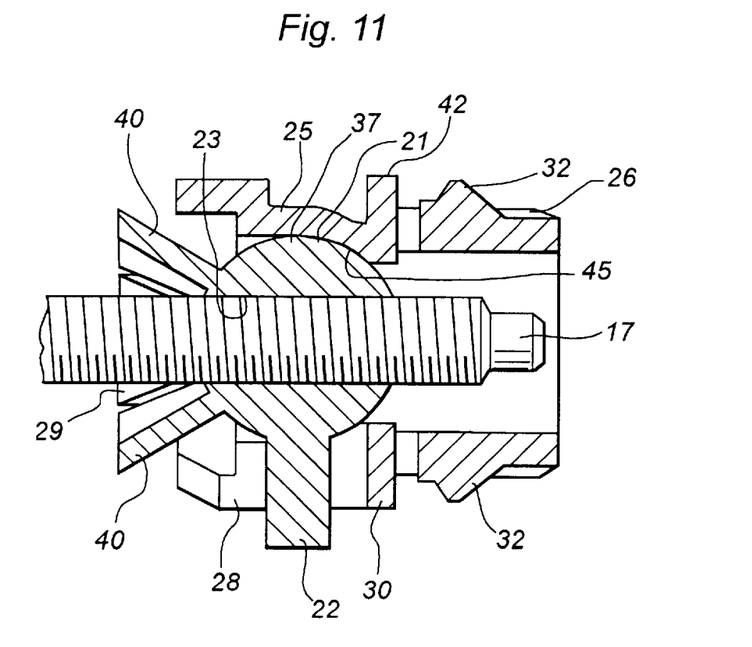
FIG. 11 is a view similar to FIG. 9 except that the socket member is shown together with the ball member of FIG. 8 rotatably received therein and an aiming screw engaged with the ball member.

FIG. 8 shows a modified ball member 37, and FIGS. 9 and 10 a correspondingly modified socket member 42. FIG. 11 shows the ball member 37 rotatably received in the socket member 42, with the aiming screw 17 extending through the tapped hole in the ball member. The modified ball member 37 and socket member 42 are both intended for use as parts of the aiming screw means in the aimable headlamps of both FIGS. 1 and 7.

The modified ball member 37 features a pair of opposed, flaring guide wings 40 formed on the ball 21 in one piece therewith for guiding the aiming screw 17 into the tapped hole 23. The opposed faces of the guide wings 40 are concaved for more infallibly guiding the aiming screw into the hole 23.

A comparison of FIGS. 9 and 10 with FIGS. 2 and 3 will reveal that the modified socket member 42 is identical with the first disclosed socket member 24 except that the pair of detents 29 are formed not directly on the rear end of the socket portion 25, as in the socket member 24, but on the rear ends of a pair of tongues 47. These tongues project rearwardly from diametrically opposite positions on the rear end of the socket portion 25.

When the ball member 37 is engaged in the socket member 42 as pictured in FIG. 11, the tongues 47 provide spaces therebetween for receiving the pair of flaring guides 40 of the ball member in an interdigitating manner. It is understood that the spaces are large enough to accommodate the guides 40 with sufficient clearances to permit required degrees of angular displacement of the ball 21 relative to the socket member 42.

Figure 12:
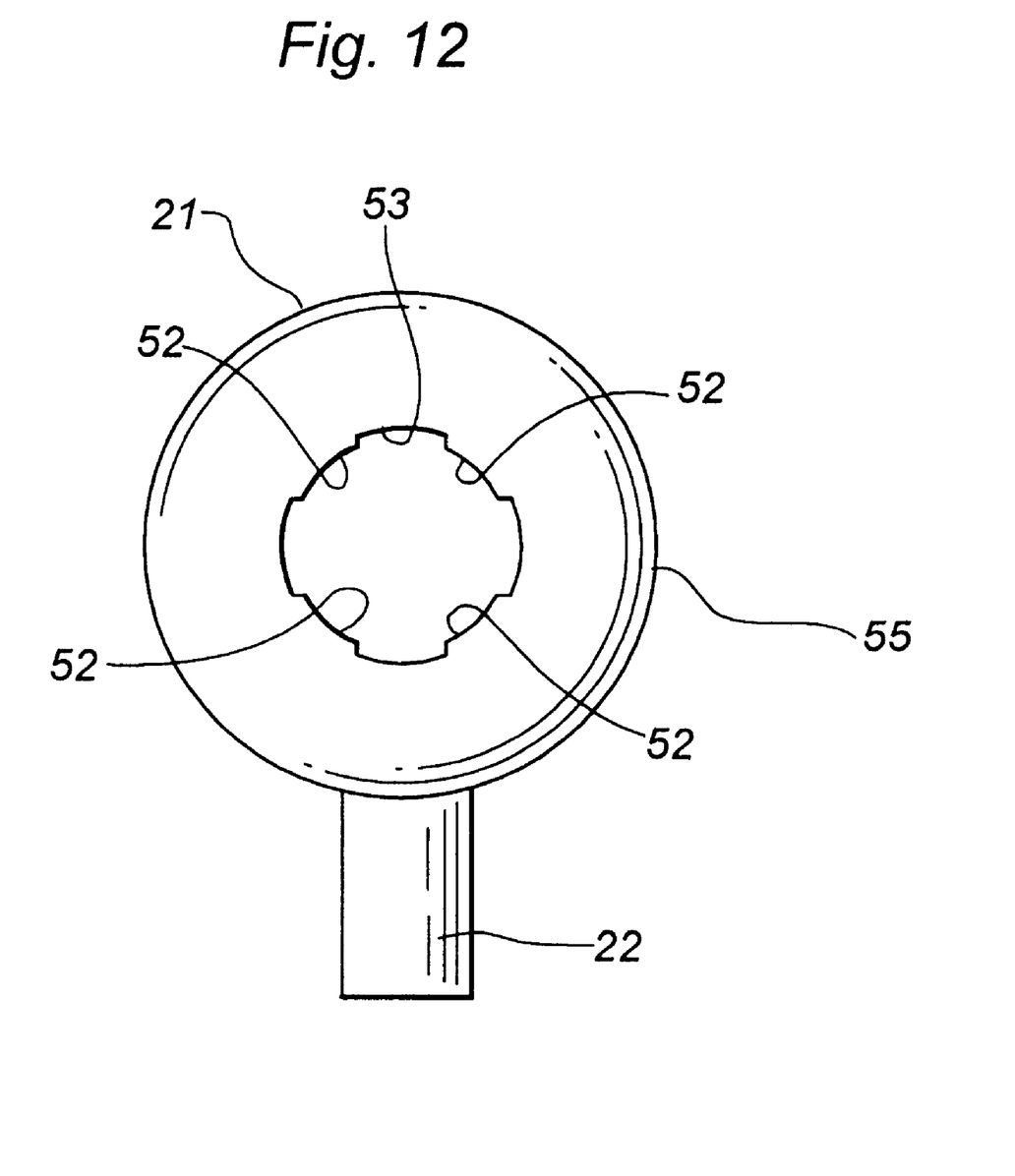
FIG. 12 is an elevation of another modified ball member for use in the headlamp of FIGS. 1 or 7.

FIG. 12 shows another modified ball member 55 having a hole 53 which is not tapped as in the foregoing embodiments but which has, instead, a plurality of ridges 52 running lengthwise on the surface bounding the hole 53. As the aiming screw is driven into the hole 53, threads will be cut in the ridges 52.

Not withstanding the foregoing detailed disclosure, it is not desired that the present invention be limited by the exact details of the illustrated embodiments. For example, the invention is applicable not only to vehicle lamps having a tiltable reflector but also to those in which a lamp unit is tilted relative to the vehicle. A variety of additional modifications, alterations or adaptations of the illustrated embodiment will suggest themselves to one skilled in the art, in order to conform to design preferences or to meet the requirements of each specific application of the invention, without departure from the proper scope or fair meaning of the subjoined claims.

What is claimed is:

1. In an aimable vehicle lamp wherein a tiltable member is tilted relative to a fixed member in two orthogonal directions for aiming the lamp, an aiming mechanism for tilting the tiltable member relative to the fixed member in one of the two orthogonal directions, the aiming mechanism comprising:
   (a) an aiming screw to be rotatably supported by the fixed member;
   (b) a socket member to be affixed to the tiltable member, the socket member having a hollow extending therethrough for receiving the aiming screw with clearance, part of the hollow being formed into a socket;
   (c) a ball having a hole extending therethrough for receiving and screw-threadedly engaging the aiming screw, the ball being received in the socket in the socket member and thereby constrained to rotary motion only; and
   (d) means on the ball for locking the same against rotation relative to the socket member about an axis of the hole therein;
   (e) whereby when the tiltable member is tilted relative to the fixed member, the socket member on the tiltable member is pivotable around the ball to afford smooth tilting motion of the tiltable member.

2. The aimable vehicle lamp of claim 1 wherein the locking means comprises a lockpin formed on the ball and received in a slot in the socket member.

3. The aimable vehicle lamp of claim 1 wherein the socket member has a pair of opposite ends between which extends the hollow, and wherein the socket member is formed to include at least a pair of detents in diametrically opposite positions on one end thereof, the detents projecting into the hallow the socket member for rotatably retaining the ball therein.

4. The aimable vehicle lamp of claim 3 wherein the detents on the socket member are angled toward each other as they extend from one end toward the other end of the socket member in order to facilitate the admission of the aiming screw, together with the ball thereon, into the hollow in the socket member.

5. The aimable vehicle lamp of claim 1 wherein the ball is formed to include guide means for guiding the aiming screw into threaded engagement in the hole in the ball.

6. The aimable vehicle lamp of claim 5 wherein the guide means comprises a pair of opposed, flaring guide wings formed on the ball.

7. The aimable vehicle lamp of claim 6 wherein the socket member has a pair of opposite ends between which extends the hollow, and wherein the socket member is formed to include a pair of detents formed in diametrically opposite positions on one end thereof and projecting into the hollow therein for rotatably retaining the ball in the socket, the detents being arranged interdigitatingly with the guide wings on the ball.

8. In an aimable vehicle lamp, in combination:
   (a) a fixed member;
   (b) a tiltable member;
   (c) a pivotal connection between the fixed member and the tiltable member;
   (d) first aiming means coupled between the fixed member and the movable member for tilting the tiltable member relative to the fixed member about a first axis passing the pivotal connection; and
   (e) second aiming means coupled between the fixed member and the movable member for tilting the tiltable member relative to the fixed member about a second axis passing the pivotal connection, the first and the second axes being at right angles to each other, the second aiming means comprising:

(1) an aiming screw rotatably supported by the fixed member;

(2) a socket member affixed to the tiltable member, the socket member having a hollow extending therethrough for receiving the aiming screw with clearance, part of the hollow being formed into a socket;

(3) a ball having a hole extending therethrough for receiving and screw-threadedly engaging the aiming screw, the ball being received in the socket in the socket member and thereby constrained to rotary motion only; and (4) means on the ball for locking the same against rotation relative to the socket member about an axis of the hole therein;

(f) whereby bidirectional rotation of the aiming screw is translated into linear reciprocation of the ball while the socket member is permitted to undergo angular displacement relative to the ball upon linear reciprocation thereof.

9. The aimable vehicle lamp of claim 8 wherein the first aiming means comprises:

(a) a leveling actuator supported by the fixed member, the leveling actuator having a connecting rod extending therefrom toward the tiltable member and terminating in a ball, the connecting rod being reciprocable longitudinally; and (b) a socket member supported by the tiltable member and rotatably receiving the ball of the connecting rod.

10. The aimable vehicle lamp of claim 9 wherein the socket member of the first aiming means defines an undercut groove for rotatably receiving the ball of the connecting rod, the undercut groove extending along the second axis.

11. The aimable vehicle lamp of claim 8 wherein the pivotal connection is of the same construction as the second aiming means.

* * * * *